US008402802B2

(12) United States Patent
Kuchi et al.

(10) Patent No.: US 8,402,802 B2

(45) Date of Patent: Mar. 26, 2013

(54) CONVEYING DEVICE, HOT ROLLING APPARATUS, CONVEYING METHOD, AND HOT ROLLING METHOD

(75) Inventors: Masahiro Kuchi, Yokohama (JP); Hajime Ishii, Tokyo (JP); Hisashi Honjou, Yokohama (JP)

(73) Assignees: IHI Metaltech Co., Ltd (JP); IHI Corporation (JP)

( * ) Notice: Subject to any disclaimer, the term of this patent is extended or adjusted under 35 U.S.C. 154(b) by 349 days.

(21) Appl. No.: 12/863,301

(22) PCT Filed: Jan. 15, 2009

(86) PCT No.: PCT/JP2009/050462

§ 371 (c)(1), (2), (4) Date: Jul. 16, 2010

(87) PCT Pub. No.: WO2009/090993

PCT Pub. Date: Jul. 23, 2009

(65) Prior Publication Data

US 2010/0294009 A1 Nov. 25, 2010

(30) Foreign Application Priority Data

Jan. 17, 2008 (JP) ................................ P2008-008136

(51) Int. Cl.
*B21B 41/00* (2006.01)
*B65G 13/06* (2006.01)

(52) U.S. Cl. ............................ 72/251; 72/200; 198/784

(58) Field of Classification Search ................... 72/13.1, 72/13.2, 13.4, 13.5, 13.8, 14.1, 14.4, 20.1, 72/20.2, 20.5, 200, 202, 227, 250, 251, 10.3; 198/784, 781.06

See application file for complete search history.

(56) References Cited

U.S. PATENT DOCUMENTS

| | | | | |
|---|---|---|---|---|
| 2,056,510 | A * | 10/1936 | Fallon | 432/34 |
| 5,910,185 | A * | 6/1999 | Figge | 72/202 |
| 2010/0180655 | A1* | 7/2010 | Ishige et al. | 72/200 |

FOREIGN PATENT DOCUMENTS

| | | |
|---|---|---|
| JP | 62-66593 | 3/1987 |
| JP | 7-88528 | 4/1995 |
| JP | 2002-19947 | 1/2002 |
| JP | 2004-160531 | 6/2004 |

OTHER PUBLICATIONS

International Search Report and Written Opinion mailed Apr. 14, 2009 in corresponding PCT International Application No. PCT/JP2009/050462.

* cited by examiner

*Primary Examiner* — Debra Sullivan

(74) *Attorney, Agent, or Firm* — Ostrolenk Faber LLP

(57) ABSTRACT

A conveying device includes a plurality of conveying rollers supported in parallel at predetermined intervals, and conveys a workpiece to a heat-retaining/heating furnace from a rolling mill by the conveying rollers. The conveying device includes an impact prediction data collecting unit and a control unit. The impact prediction data collecting unit acquires data on the upstream of the heat-retaining/heating furnace. The data is used to predict the magnitude of an impact applied to rollers in the furnace, which are positioned in the heat-retaining/heating furnace, of the conveying rollers by the workpiece. The control unit predicts the magnitude of an impact from the data, which is acquired by the impact prediction data collecting unit, and adjusts the conveying speed of the workpiece in the heat-retaining/heating furnace according to the magnitude of the impact.

12 Claims, 4 Drawing Sheets

CONVEYING DEVICE, HOT ROLLING APPARATUS, CONVEYING METHOD, AND HOT ROLLING METHOD

CROSS-REFERENCE TO RELATED APPLICATIONS

The present application is a 35 U.S.C. §§371 national phase conversion of PCT/JP2009/050462, filed Jan. 15, 2009, which claims priority of Japanese Patent Application No. 2008-008136, filed Jan. 17, 2008, the contents of which are incorporated herein by reference. The PCT International Application was published in the Japanese language.

TECHNICAL FIELD

The present invention relates to a conveying device, a hot rolling apparatus, a conveying method, and a hot rolling method.

BACKGROUND ART

In the past, a hot rolling apparatus, which performs the hot rolling of a workpiece such as a steel plate, has included a roughing mill and a finishing mill, and has further included a heating furnace or a heat-retaining/heating furnace, a shearing machine, a winding machine, and the like.

The above-mentioned hot rolling apparatus, first, heats a workpiece by a heating furnace. Then, the hot rolling apparatus performs the rough rolling of the workpiece by a roughing mill, conveys the workpiece while reheating the workpiece and retaining the heat of the workpiece by the heat-retaining/heating furnace, cuts front and rear ends of the workpiece by a shearing machine, performs the finish rolling of the workpiece by a finishing mill, and winds the workpiece using a winding machine.

Meanwhile, the conveying roller in the heat-retaining/heating furnace is made of heat-resistant steel so as to withstand high temperatures.

However, since deformation, such as wave or warpage, occurs at (particularly, a front end portion of) the workpiece that has been subject to the rough rolling, the conveying rollers in the heat-retaining/heating furnace receive an impact from the workpiece.

For this reason, the internal temperature of the heat-retaining/heating furnace is set so that the strength of the conveying roller does not deteriorate. Further, the conveying speed of the workpiece in the heat-retaining/heating furnace is set so that an impact exceeding an impact capable of being withstood by the conveying roller is not applied to the conveying roller. Specifically, the internal temperature is set to 1000° C. or less and the conveying speed is set to about 100 m/minute.

[Patent Citation 1] Japanese Unexamined Patent Application, First Publication No. H07-88528

DISCLOSURE OF THE INVENTION

Problem to be Solved by the Invention

Conventionally, the internal temperature of the heat-retaining/heating furnace and the conveying speed have been limited due to the above-mentioned circumstances, so that the internal temperature of the heat-retaining/heating furnace and the conveying speed could not be increased. However, in terms of metallurgy, it is preferable that the internal temperature of the heat-retaining/heating furnace be increased as compared to the current set temperature. Further, in terms of work efficiency, it is preferable that the conveying speed be increased.

However, if the conveying speed in the heat-retaining/heating furnace is increased, there occurs a problem that an impact applied to the conveying roller from a deformed portion of the workpiece is increased. Moreover, if the internal temperature of the heat-retaining/heating furnace is set to a high temperature, there occurs a problem that the strength of the conveying roller decreases.

The invention has been made in consideration of the above-mentioned circumstances, and an object of the invention is to provide a conveying device, a hot rolling apparatus, a conveying method, and a hot rolling method that can prevent the breakage of a conveying roller even though the temperature and speed of hot rolling are increased.

Means for Solving the Problem

In order to solve the above-mentioned problems, a conveying device, a hot rolling apparatus, a conveying method, and a hot rolling method according to the invention have employed the following means.

According to a first aspect of the invention, there is provided a conveying device that includes a plurality of conveying rollers supported in parallel at predetermined intervals and conveys a workpiece to a heat-retaining/heating furnace from a rolling mill by the conveying rollers. The conveying device includes an impact prediction data collecting unit and a control unit. The impact prediction data collecting unit acquires data on the upstream of the heat-retaining/heating furnace. The data is used to predict the magnitude of an impact applied to rollers in the furnace, which are positioned in the heat-retaining/heating furnace, of the conveying rollers by the workpiece. The control unit predicts the magnitude of an impact from the data, which is acquired by the impact prediction data collecting unit, and adjusts the conveying speed of the workpiece in the heat-retaining/heating furnace according to the magnitude of the impact.

Then, in the aspect of the invention, the impact prediction data collecting unit is provided at a bearing unit that supports at least one of the conveying rollers, and acquires data, which relates to at least one of deformation and vibration of the bearing unit, as the data.

Further, in the aspect of the invention, the impact prediction data collecting unit includes an imaging device, and acquires an image of the workpiece conveyed on the upstream of the heat-retaining/heating furnace, which is photographed by the imaging device, as the data.

Furthermore, in the aspect of the invention, the heat-retaining/heating furnace heats and keeps the workpiece at a temperature of 1000° C. or more.

Moreover, in the aspect of the invention, the maximum conveying speed of the workpiece, which is conveyed by the rollers in the furnace, is 200 m/minute or more.

According to a second aspect of the invention, there is provided a hot rolling apparatus for rolling a workpiece, which is heated by a heating furnace, by a roughing mill, conveying the workpiece to a finishing mill while adjusting the temperature of the workpiece by a heat-retaining/heating furnace, and rolling the workpiece by the finishing mill. The hot rolling apparatus includes the conveying device according to the first aspect of the invention.

According to a third aspect of the invention, there is provided a conveying method of conveying a workpiece to a heat-retaining/heating furnace from a rolling mill by moving the workpiece on a plurality of conveying rollers that is supported in parallel at predetermined intervals. The conveying method includes predicting the magnitude of an impact that is applied to rollers in the furnace by the workpiece on the upstream of the heat-retaining/heating furnace, and adjusting a conveying speed of the workpiece in the heat-retaining/heating furnace according to the magnitude of the predicted impact. The rollers in the furnace are the conveying rollers positioned in the heat-retaining/heating furnace.

Then, in the aspect of the invention, the prediction of the impact is performed on the basis of at least one of deformation and vibration of a bearing unit that supports at least one of the conveying rollers.

Further, in the aspect of the invention, the prediction of the impact is performed on the basis of a photographed image of the workpiece that is conveyed on the upstream of the heat-retaining/heating furnace.

Furthermore, in the aspect of the invention, the heat-retaining/heating furnace heats and keeps the workpiece at a temperature of 1000° C. or more.

Moreover, in the aspect of the invention, the maximum conveying speed of the workpiece, which is conveyed by the rollers in the furnace, is 200 m/minute or more.

According to a fourth aspect of the invention, there is provided a hot rolling method of hot rolling a workpiece. The hot rolling method includes conveying the workpiece by the conveying method according to the third aspect.

ADVANTAGEOUS EFFECTS

According to the invention, the magnitude of an impact, which is applied to the roller in the furnace by the workpiece, is predicted on the upstream of the heat-retaining/heating furnace and the conveying speed of the workpiece in the heat-retaining/heating furnace is adjusted according to the predicted magnitude of the impact. Accordingly, it is possible to increase the conveying speed if a small impact is predicted, and to reduce the conveying speed if a large impact is predicted.

Accordingly, even if the strength of the roller in the furnace is decreased as compared to the strength of the roller in the furnace at conventional set temperature due to the increase of the internal temperature of the heat-retaining/heating furnace, it is possible to appropriately increase the conveying speed by grasping the magnitude of the impact, which can be withstood by the roller in the furnace, and adjusting the conveying speed so that an impact larger than the impact is not applied to the roller in the furnace.

Therefore, it is possible to prevent the breakage of the roller in the furnace even though the temperature and speed of the hot rolling are increased as a whole, by increasing the processing temperature and appropriately increasing the conveying speed during the time, particularly, after rough rolling and before finishing rolling of hot rolling.

DESCRIPTION OF REFERENCE NUMERALS

1 HOT ROLLING APPARATUS
2 HEATING FURNACE
3 FRONT TABLE
3*a* CONVEYING ROLLER
4 ROUGHING MILL
5 REAR TABLE
5*a* CONVEYING ROLLER
50 AXLE BOX (BEARING UNIT)
6 HEAT-RETAINING/HEATING FURNACE
6*a* CONVEYING ROLLER (ROLLER IN A FURNACE)
6*b* DRIVE MOTOR
11 CONTROL UNIT
12 IMPACT PREDICTION DATA COLLECTING UNIT
20 CONVEYING DEVICE
X SLAB (WORKPIECE)
Y METAL SHEET (WORKPIECE)
212 IMPACT PREDICTION DATA COLLECTING UNIT
212*a* IMAGING DEVICE

BEST MODE FOR CARRYING OUT THE INVENTION

An embodiment of the invention will be described below with reference to drawings.

Figure 1:
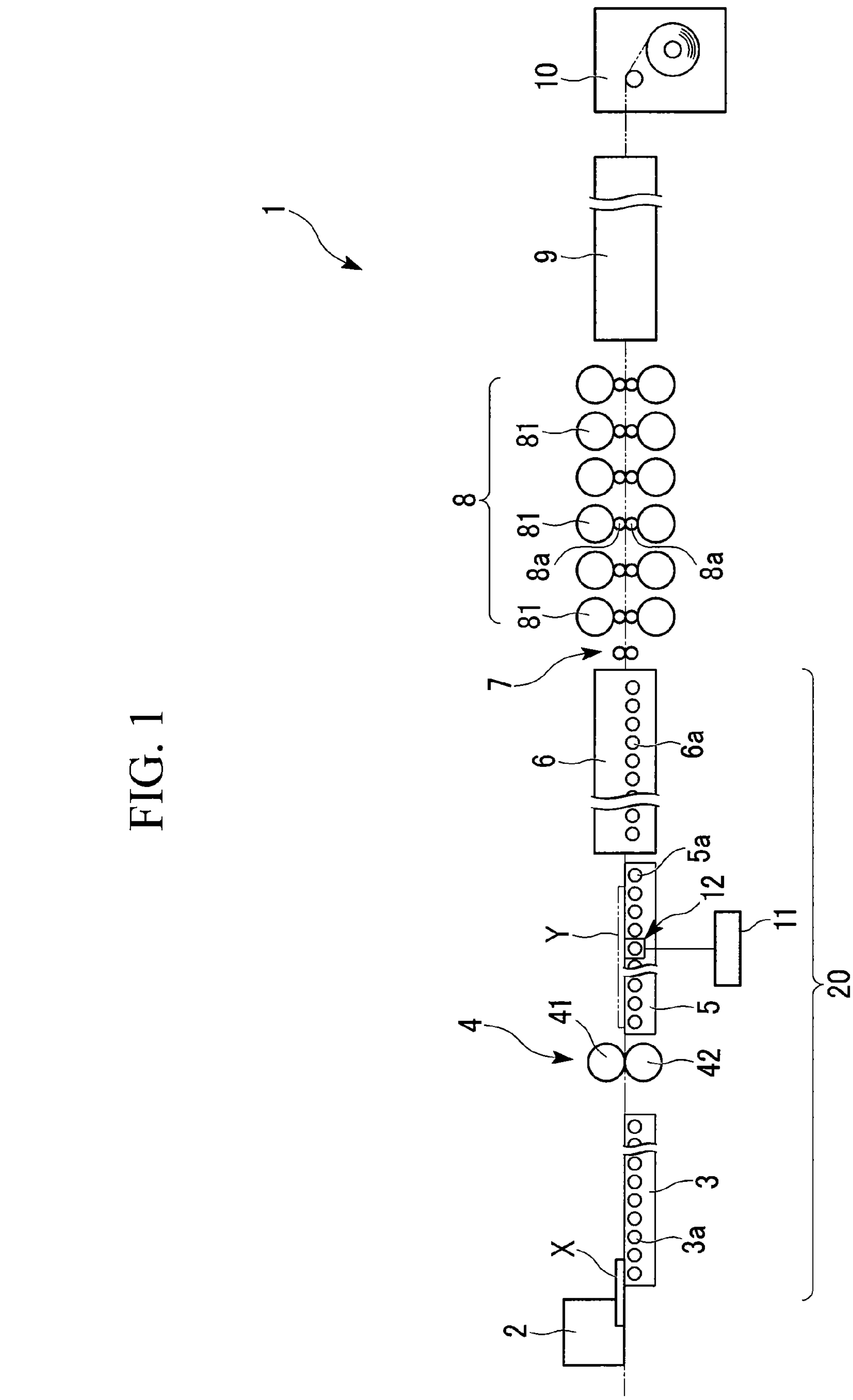
FIG. 1 is a view showing the schematic structure and functional structure of a conveying device according to an embodiment of the invention and a hot rolling apparatus including the conveying device

FIG. 1 is a view showing the schematic structure and functional structure of a conveying device 20 according to an embodiment of the invention and a hot rolling apparatus 1 including the conveying device 20.

As shown in this drawing, the hot rolling apparatus 1 according to this embodiment includes a heating furnace 2, a front table 3, a roughing mill 4, a rear table 5, a heat-retaining/heating furnace 6, a shearing machine 7, a finishing mill 8, a cooling device 9, a winding machine 10, a control unit 11, and an impact prediction data collecting unit 12.

The heating furnace 2 heats a slab X (workpiece), which contains steel as a main ingredient and copper, up to a temperature suitable for rough rolling before the slab is rolled by the roughing mill 4.

The front table 3 is disposed at the subsequent stage of the heating furnace 2, and includes a plurality of conveying rollers 3*a* that is arranged in a line direction.

The front table 3 conveys the slab X, which is carried out of the heating furnace 2, to the roughing mill 4 and supports the slab X from below when the slab X is repeatedly rolled while being moved back and forth in the roughing mill 4 which is described below.

The roughing mill 4 includes a pair of rolling rollers 41 and 42 to be rotated, and shapes the slab X into a metal sheet Y (workpiece) by rolling the slab X between the rolling rollers 41 and 42. The rolling rollers 41 and 42 are rotationally driven in synchronization with each other, but the rotation directions of the rolling rollers may be reversed. For this reason, it is possible to repeatedly roll the slab while moving back and forth the slab X.

Figure 2:
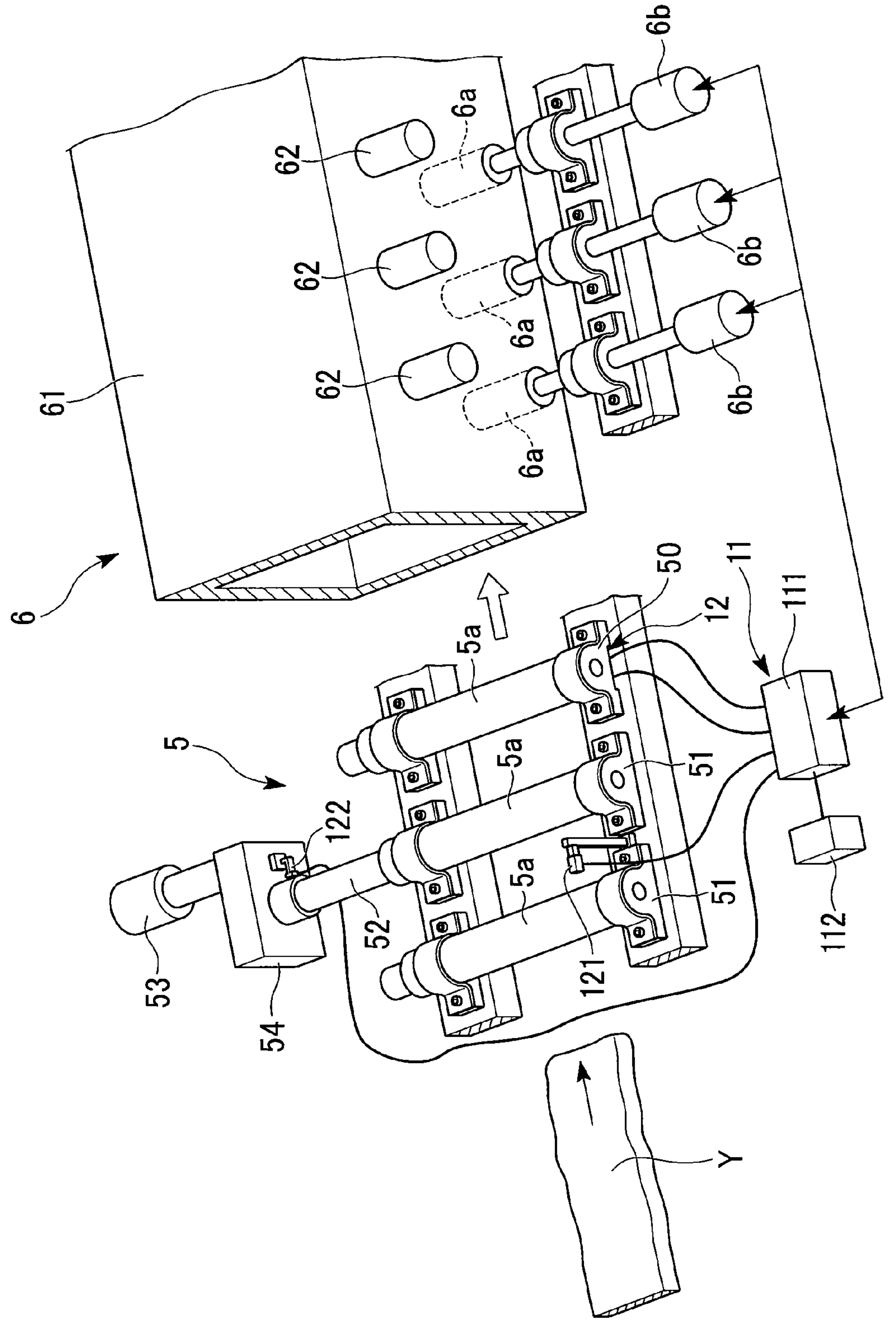
FIG. 2 is a perspective view of a heat-retaining/heating furnace and a rear table of the embodiment.

Here, the embodiment of the invention will continue to be described with reference to FIG. 2 in addition to FIG. 1. FIG. 2 is a perspective view of the heat-retaining/heating furnace 6 and the rear table 5.

The rear table 5 includes a plurality of conveying rollers 5*a* arranged in a line direction, axle boxes 50 and 51, a drive shaft 52, a motor 53, and a gearbox 54. The rear table 5 conveys the metal sheet Y, which is carried out of the roughing mill 4, to the heat-retaining/heating furnace 6 and supports the slab X from below when the slab X is repeatedly rolled while being moved back and forth in the roughing mill 4.

The conveying rollers 5*a* are rotatably supported by the axle boxes 50 and 51. The drive shaft 52 is connected to the conveying roller 5*a*, and a driving force of the motor 53 is transmitted to the drive shaft 52 through gears that are received in the gearbox 54.

The length of the rear table 5 is set to be larger than the length of the slab X that protrudes from the roughing mill 4 in the final back and forth movement of the slab X from the roughing mill 4 toward the heat-retaining/heating furnace 6.

Meanwhile, the final back and forth movement, which has been described here, means the back and forth movement (pass before the final pass) of the slab before the slab X is finally moved from the roughing mill 4 to the finishing mill 8. That is, the length of the slab X, which protrudes from the roughing mill 4 in the final back and forth movement, is the length of the slab X, which protrudes from the roughing mill 4 before the slab X is finally moved from the roughing mill 4 to the finishing mill 8 (in the pass before the final pass).

That is, in the hot rolling apparatus 1, in the case of the final back and forth movement, the length of the rear table 5 is set to be larger than the length of the slab X when the slab X protrudes most from the roughing mill 4 toward the heat-retaining/heating furnace 6.

For this reason, the front end of the slab X does not reach the heat-retaining/heating furnace 6 in the rolling of the slab X that is performed at the roughing mill 4, and the slab X is not exposed to an atmosphere in the heat-retaining/heating furnace 6 during the period of the rolling of the slab X that is performed at the roughing mill 4.

The heat-retaining/heating furnace 6 includes a tunnel furnace 61 and heating burners 62. The heat-retaining/heating furnace 6 retains the heat of the metal sheet Y and heats the metal sheet independently of the heating furnace 2, and keeps the metal sheet Y at a temperature of about 1100° C. in the hot rolling apparatus 1.

The heat-retaining/heating furnace 6 has a length (for example, 60 to 70 m) close to the entire length of the metal sheet Y that is carried out of the roughing mill 4. The heat-retaining/heating furnace 6 may retain the heat of the metal sheet Y without bending the metal sheet.

Meanwhile, a plurality of conveying rollers 6*a* (rollers in the furnace) is arranged inside the heat-retaining/heating furnace 6 in the line direction, and the metal sheet Y is movably supported by these conveying rollers 6*a*.

The conveying rollers 6*a* are rotationally driven by the driving forces of drive motors 6*b*. Further, when the wave or warpage of the metal sheet Y is small, the conveying speed of the metal sheet Y in the heat-retaining/heating furnace 6 of the hot rolling apparatus 1 is about 300 m/minute. When the wave or warpage of the metal sheet Y is large, the conveying speed of the metal sheet in the heat-retaining/heating furnace 6 is lowest, that is, about 100 m/minute.

The conveying roller 6*a* is made of heat-resistant steel that has a predetermined strength even at a temperature of 1100° C.

Further, the conveying device 20 of the hot rolling apparatus 1 includes a front table 3, the rear table 5, the conveying rollers 6*a*, and the drive motors 6*b*.

Returning to FIG. 1, the shearing machine 7 is provided at the subsequent stage of the heat-retaining/heating furnace 6, and cuts the front end of the metal sheet Y that is carried out of the heat-retaining/heating furnace 6.

The finishing mill 8 includes a plurality of rolling mills 81 that is formed of a plurality of rolling rollers 8*a* and is arranged along the line. The finishing mill 8 sets the shape of the metal sheet Y by further rolling the metal sheet Y that is carried out of the heat-retaining/heating furnace 6.

The cooling device 9 is provided at the subsequent stage of the finishing mill 8, and cools the metal sheet Y of which the shape is set by the finishing mill 8. In this embodiment, the cooling device 9 cools the metal sheet Y by water cooling.

The winding machine 10 is provided at the subsequent stage of the cooling device 9, and winds the metal sheet Y that is cooled by the cooling device 9.

The control unit 11 controls the entire operation of the hot rolling apparatus 1, and is electrically connected to the heating furnace 2, the front table 3, the roughing mill 4, the rear table 5, the heat-retaining/heating furnace 6, the shearing machine 7, the finishing mill 8, the cooling device 9, the winding machine 10, and the impact prediction data collecting unit 12.

As shown in FIG. 2, the control unit 11 includes a data processor 111 and a data storage unit 112.

The data processor 111 determines the rotational speed of the conveying rollers 6*a* by the data input from the impact prediction data collecting unit 12, and controls the drive motors 6*b*. The data storage unit 112 stores the data that are input from the impact prediction data collecting unit 12 through the data processor 111.

Figure 3B:
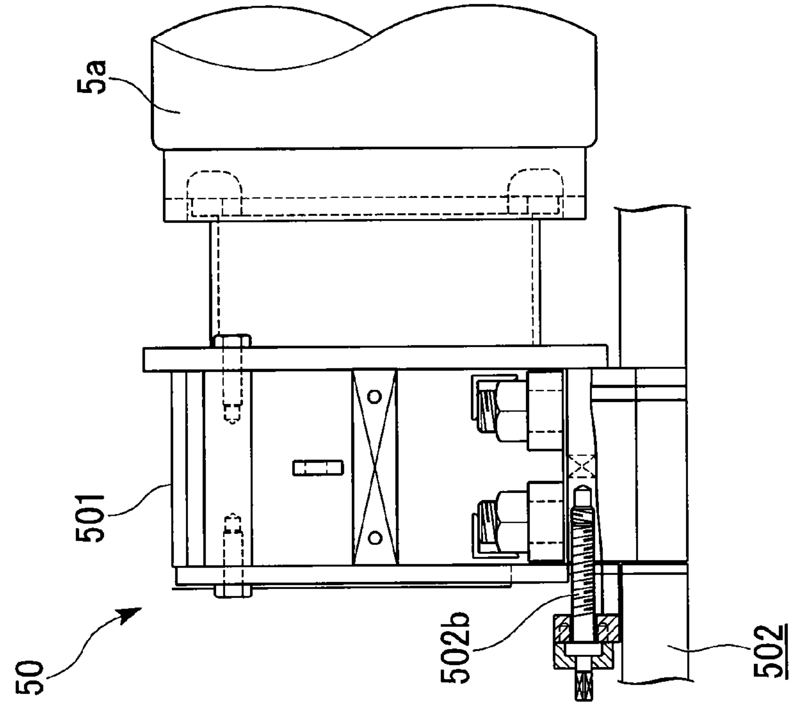
FIG. 3B shows a side view of an axle box of the embodiment.
Figure 3A:
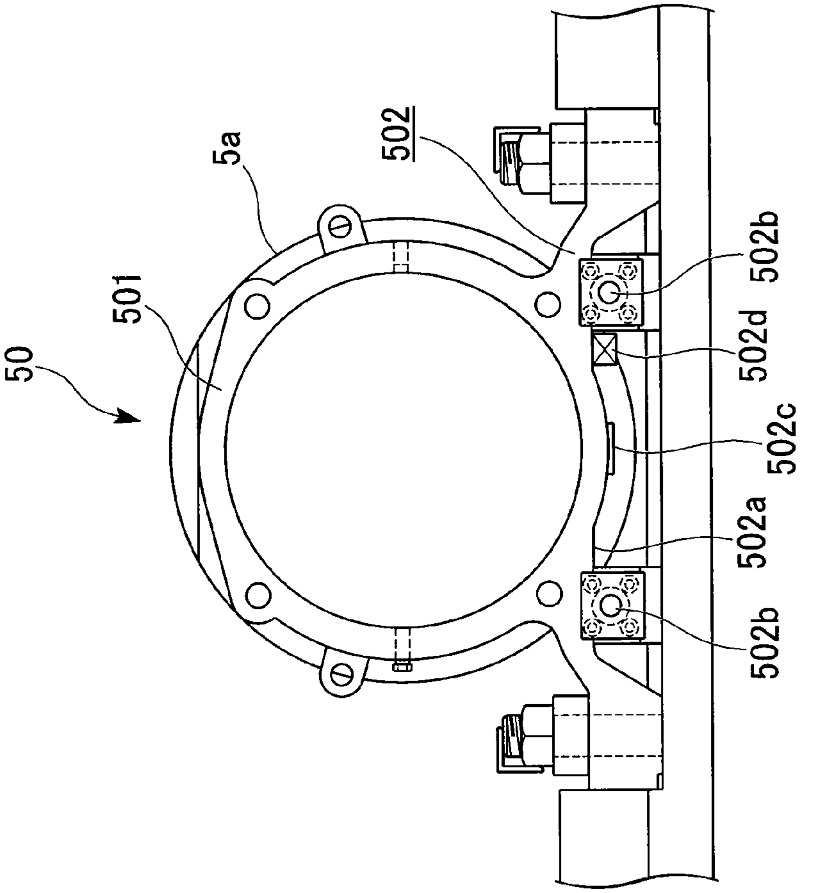
FIG. 3A shows a front view of an axle box of the embodiment.

The impact prediction data collecting unit 12 will be described below with reference to FIGS. 3A and 3B. FIG. 3A shows a front view of the axle box 50 (bearing unit) and FIG. 3B shows a side view of the axle box 50.

As shown in FIG. 2, the impact prediction data collecting unit 12 includes the axle box 50, a plate detecting HMD (Hot Metal Detector) 121, and a speed detector 122.

The axle box 50 includes an annular portion 501 and a pedestal portion 502.

The annular portion 501 is an annular portion that holds the end portion of the conveying roller 5*a*.

The pedestal portion 502 extends from a lower portion of the annular portion 501 in a width direction of a shaft, has a substantially trapezoidal shape, and supports the annular portion 501. Since a recess 502*a* is formed on the lower surface of the pedestal portion 502, the thickness of the pedestal portion is relatively thin.

A middle portion of the recess 502*a* is formed substantially along the curvature of the annular portion 501. Further, the pedestal portion 502 includes detachable support bolts 502*b*, which are used to reinforce the thin pedestal portion 502 as necessary, on both sides of the recess 502*a*.

Further, the pedestal portion 502 is provided with a strain gauge 502*c* that is attached to the middle position of the recess 502*a*, and an accelerometer 502*d* that is disposed in the recess 502*a* at a position not overlapping the strain gauge 502*c*.

The strain gauge 502*c* outputs a signal, which corresponds to the strain generated at the middle position of the recess 502*a*, to the data processor 111. The accelerometer 502*d* outputs a measured value to the data processor 111.

The plate detecting HMD 121 is provided on the upstream side of the axle box 50. When detecting the metal sheet Y, the plate detecting HMD 121 outputs a signal, which represents that the metal sheet Y approaches the axle box 50, to the data processor 111.

The speed detector 122 is mounted on the gearbox 54. The speed detector 122 detects the rotational speed of the drive shaft and outputs the rotational speed to the data processor 111. The data processor 111 calculates the conveying speed of the metal sheet Y on the basis of the rotational speed of the drive shaft that is input from the speed detector 122.

The operation of the hot rolling apparatus 1 according to this embodiment, which has the above-mentioned structure, will be described below. Meanwhile, the operation of the hot rolling apparatus 1 is mainly performed by the above-mentioned control unit 11.

First, if a slab X is heated up to a predetermined temperature in the heating furnace 2, the heated slab X is supplied to the roughing mill 4.

The slab X, which is supplied to the roughing mill 4, is repeatedly rolled by the roughing mill 4 while being moved back and forth several times (for example, three times). As a result, the slab X is shaped into a metal sheet Y.

Here, while the slab X is rolled by the roughing mill 4 of the hot rolling apparatus 1, the slab X is supported from below by the front table 3 or the rear table 5 and is movable to the left and right sides of the conveying direction of the slab X.

The metal sheet Y, which is shaped by the roughing mill 4, is supplied to the heat-retaining/heating furnace 6 through the rear table 5 at a speed of 100 to 300 m/minute and is kept at a temperature of about 1100° C.

After the front end portion of the metal sheet Y carried out of the heat-retaining/heating furnace 6 is cut by the shearing machine 7, the metal sheet is further rolled by the finishing mill 8. As a result, the metal sheet has a desired thickness.

Further, after being cooled by the cooling device 9, the metal sheet Y rolled by the finishing mill 8 is wound by the winding machine 10.

The conveying speed of the metal sheet Y in the heat-retaining/heating furnace 6 is controlled by the control unit 11. A procedure thereof will be described below in detail.

First, the control unit 11 predicts the magnitude of an impact, which is applied to the conveying rollers 5*a* by the metal sheet Y conveyed on the rear table 5, on the basis of the data collected by the impact prediction data collecting unit 12.

Specifically, if the plate detecting HMD 121 detects the metal sheet Y and outputs a signal to the data processor 111, the data processor 111 calculates the strain, which is generated at the pedestal portion 502, by a signal input from the strain gauge 502*c* and calculates vibration, which is generated at the pedestal portion 502, by a signal input from the accelerometer 502*d*. Further, the data processor 111 calculates the magnitude of an impact, which is applied to the conveying rollers 5*a* by the metal sheet Y, from the strain and vibration, and regards the calculated value as a predictive value of the magnitude of an impact that is applied to the conveying roller 6*a* by the metal sheet Y.

After that, the data processor 111 determines an appropriate value of the conveying speed of the metal sheet Y in the heat-retaining/heating furnace 6, on the basis of the predictive value.

Moreover, the data processor 111 adjusts the conveying speed of the metal sheet Y in the heat-retaining/heating furnace 6 by controlling the drive motors 6*b*, and controls the motor 53 so that the conveying speed calculated from the rotational speed input from the speed detector 122 is close to the appropriate value.

According to the above-mentioned embodiment, even though the temperature in the heat-retaining/heating furnace 6 is set to 1100° C. that is higher than the temperature in the conventional heat-retaining/heating furnace and the conveying speed of the metal sheet Y is set to 300 m/minute that is about three times as high as the conventional speed of the metal sheet, it is possible to reduce an impact, which is applied to the conveying rollers 6*a*, by reducing the conveying speed of the metal sheet Y if the magnitude of an impact, which is applied to the conveying rollers 6*a* by the metal sheet Y, exceeds a value of an impact that can be withstood by the conveying rollers 6*a* kept (or heated) at a temperature of 1100° C.

That is, the magnitude of an impact, which is applied to the conveying roller 6*a* by the metal sheet Y on the upstream of the heat-retaining/heating furnace 6, is predicted and the conveying speed of the metal sheet Y in the heat-retaining/heating furnace 6 is adjusted according to the predicted magnitude of the impact. Accordingly, it is possible to increase the conveying speed if a small impact is predicted, and to reduce the conveying speed if a large impact is predicted.

Accordingly, even if the strength of the conveying roller 6*a* is decreased as compared to the strength of the conveying roller 6*a* at conventional set temperature due to the increase of the internal temperature of the heat-retaining/heating furnace 6, it is possible to appropriately increase the conveying speed by grasping the magnitude of the impact, which can be withstood by the conveying roller 6*a*, and adjusting the conveying speed so that an impact larger than the impact is not applied to the conveying rollers 6*a*.

Therefore, it is possible to prevent the breakage of the roller in the furnace even though the temperature and speed of the hot rolling are increased as a whole, by increasing the processing temperature and appropriately increasing the conveying speed between, particularly, rough rolling and finish rolling of hot rolling.

The hot rolling apparatus according to the preferred embodiment of the invention has been described above with reference to the drawings, but it goes without saying that the invention is not limited to the above-mentioned embodiment. The shapes and combination of the respective components described in the above-mentioned embodiment are illustrative, and may be modified in various ways on the basis of design requests and the like without departing from the scope of the invention.

Figure 4:
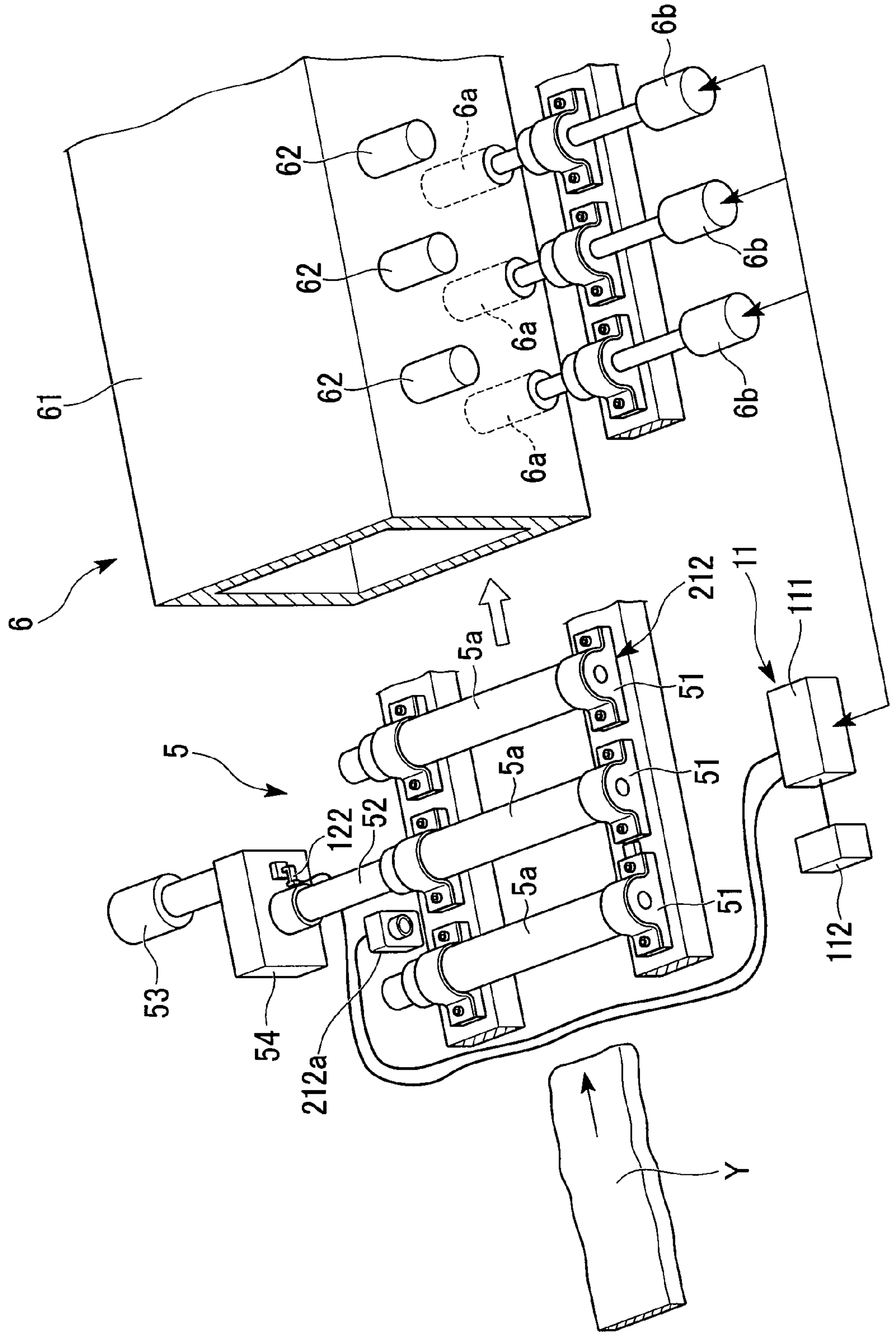
FIG. 4 is a perspective view showing an impact prediction data collecting unit of a modification of the embodiment.

The following shown in FIG. 4 is considered as a modification of the embodiment. FIG. 4 is a perspective view showing an impact prediction data collecting unit 212 of the modification.

The impact prediction data collecting unit 212 of this modification includes an imaging device 212*a* instead of the axle box 50 and the plate detecting HMD 121 of the impact prediction data collecting unit 12 of the embodiment. Further, the impact prediction data collecting unit 212 includes the same speed detector 122 as the speed detector 122 of the impact prediction data collecting unit 12 of the embodiment, in addition to the imaging device 212*a*.

Further, the difference between this modification and the embodiment has been as described above, and other portions of the modification are the same as those of the embodiment.

The imaging device 212*a* takes an image above the rear table 5, and outputs the photographed image to the data processor 111.

The data processor 111 analyzes the states of the wave, warpage, and vibration of the metal sheet Y on the basis of the image input from the imaging device 212*a*, and determines an appropriate value of the conveying speed of the metal sheet Y in the heat-retaining/heating furnace 6, on the basis of the results of analysis.

According to this structure, it is possible to obtain the same effects as the embodiment.

INDUSTRIAL APPLICABILITY

According to the invention, it is possible to prevent the breakage of the roller in the furnace even though the temperature and speed of the hot rolling are increased as a whole, by increasing the processing temperature and appropriately increasing the conveying speed between, particularly, rough rolling and finish rolling of hot rolling.

The invention claimed is:

1. A conveying device that includes a plurality of conveying rollers supported in parallel at predetermined intervals, and conveys a workpiece to a heat-retaining/heating furnace from a rolling mill by the conveying rollers, the conveying device comprising:

an impact prediction data collecting unit that acquires data on the upstream of the heat-retaining/heating furnace, the data being used to predict the magnitude of an impact applied to rollers in the furnace, which are positioned in the heat-retaining/heating furnace, of the conveying rollers by the workpiece; and a control unit that predicts the magnitude of an impact from the data, which is acquired by the impact prediction data collecting unit, and adjusts the conveying speed of the workpiece in the heat-retaining/heating furnace according to the magnitude of the impact.

2. The conveying device according to claim 1, wherein the impact prediction data collecting unit is provided at a bearing unit that supports at least one of the conveying rollers, and acquires data, which relates to at least one of deformation and vibration of the bearing unit, as the data.

3. The conveying device according to claim 1, wherein the impact prediction data collecting unit includes an imaging device, and acquires an image of the workpiece conveyed on the upstream of the heat-retaining/heating furnace, which is photographed by the imaging device, as the data.

4. The conveying device according to claim 1, wherein the heat-retaining/heating furnace heats and keeps the workpiece at a temperature of 1000° C. or more.

5. The conveying device according to claim 1, wherein the maximum conveying speed of the workpiece, which is conveyed by the rollers in the furnace, is 200 m/minute or more.

6. A hot rolling apparatus for rolling a workpiece, which is heated by a heating furnace, by a roughing mill, conveying the workpiece to a finishing mill while adjusting the temperature of the workpiece by a heat-retaining/heating furnace, and rolling the workpiece by the finishing mill, the hot rolling apparatus comprising:

the conveying device according to claim 1.

7. A conveying method of conveying a workpiece to a heat-retaining/heating furnace from a rolling mill by moving the workpiece on a plurality of conveying rollers that is supported in parallel at predetermined intervals, the conveying method comprising:

predicting the magnitude of an impact that is applied to rollers in the furnace by the workpiece, the rollers in the furnace being the conveying rollers positioned in the heat-retaining/heating furnace on the upstream of the heat-retaining/heating furnace; and adjusting a conveying speed of the workpiece in the heat-retaining/heating furnace according to the magnitude of the predicted impact.

8. The conveying method according to claim 7, wherein the prediction of the impact is performed on the basis of at least one of deformation and vibration of a bearing unit that supports at least one of the conveying rollers.

9. The conveying method according to claim 7, wherein the prediction of the impact is performed on the basis of a photographed image of the workpiece that is conveyed on the upstream of the heat-retaining/heating furnace.

10. The conveying method according to claim 7, wherein the heat-retaining/heating furnace heats and keeps the workpiece at a temperature of 1000° C. or more.

11. The conveying method according to claim 7, wherein the maximum conveying speed of the workpiece, which is conveyed by the rollers in the furnace, is 200 m/minute or more.

12. A hot rolling method of hot rolling a workpiece, the hot rolling method comprising:

conveying the workpiece by the conveying method according to claim 7.

* * * * *